（12）United States Patent
Beato et al.

(10) Patent No.: US 7,982,909 B2
(45) Date of Patent: *Jul. 19, 2011

(54) METHOD FOR AUTOMATICALLY GENERATING A DYNAMIC DIGITAL METADATA RECORD FROM DIGITIZED HARDCOPY MEDIA

(75) Inventors: Louis J. Beato, Rochester, NY (US);
Anthony Scalise, Fairport, NY (US);
Joseph A. Manico, Rochester, NY (US);
Andrew C. Gallagher, Pittsburgh, PA (US)

(73) Assignee: Eastman Kodak Company, Rochester, NY (US)

( * ) Notice: Subject to any disclaimer, the term of this patent is extended or adjusted under 35 U.S.C. 154(b) by 1359 days.

This patent is subject to a terminal disclaimer.

(21) Appl. No.: 11/511,798

(22) Filed: Aug. 29, 2006

(65) Prior Publication Data

US 2007/0250529 A1      Oct. 25, 2007

Related U.S. Application Data

(63) Continuation-in-part of application No. 11/408,394, filed on Apr. 21, 2006.

(51) Int. Cl.
*G06K 15/00* (2006.01)
*G06F 3/12* (2006.01)
*H04N 5/76* (2006.01)

(52) U.S. Cl. ....... 358/1.9; 358/1.16; 358/3.28; 358/474; 348/231.2

(58) Field of Classification Search .................. 358/1.2, 358/1.9, 1.18, 501, 505, 518, 528, 403, 3.28, 358/474; 707/7; 348/231.2, 231.3
See application file for complete search history.

(56) References Cited

U.S. PATENT DOCUMENTS

| 6,745,186 B1* | 6/2004 | Testa et al. ........................ 707/7 |
| 2004/0117735 A1* | 6/2004 | Breen ........................... 715/517 |
| 2006/0198559 A1* | 9/2006 | Manico et al. ................ 382/305 |

* cited by examiner

*Primary Examiner* — Thomas J Lett
(74) *Attorney, Agent, or Firm* — Thomas J. Strouse; Raymond L. Owens

(57) ABSTRACT

The present disclosure relates to automatically generating a dynamic set of metadata from digitized hardcopy media. The technique includes scanning the image side and non-image side of a plurality of hardcopy media. A dynamic digital metadata record of each of the plurality of hardcopy media is created and used for manipulating each of the plurality of hardcopy media.

8 Claims, 14 Drawing Sheets

DERIVED MetaData:
- B/W COLOR
- BORDER —161
- BORDER Dmin
- DATE
- GROUPING (EVENT)
- ROTATION
- ANNOTATION (TEXT VIA OCR)
- ANNOTATION BITMAP
- COPYRIGHT STATUS
- BORDER STYLE
- INDEX PRINT DERIVED SEQUENCE NUMBER
- INDEX PRINT DERIVED EVENT

— 160

AFTER ANALYSIS →

DERIVED MetaData:
- COLOR = TRUE
- BORDER = TRUE
- BORDER Dmin = 0.10
- DATE = JUNE 1968
- GROUPING (EVENT) = PRESIDENT
- ROTATION = 0 DEGREE
- ANNOTATION = "JUNE 1968"
- ANNOTATION BITMAP = "JUNE 1968" BITMAP
- COPYRIGHT STATUS = NONE
- BORDER STYLE = NORMAL
- INDEX PRINT DERIVED SEQUENCE NUMBER = NONE
- INDEX PRINT DERIVED EVENT = NONE

— 170

*FIG. 6*

METHOD FOR AUTOMATICALLY GENERATING A DYNAMIC DIGITAL METADATA RECORD FROM DIGITIZED HARDCOPY MEDIA

CROSS REFERENCE TO RELATED APPLICATIONS

This is a continuation-in-part application of U.S. application Ser. No. 11/408,394 filed Apr. 21, 2006.

FIELD OF THE INVENTION

The present invention relates to digital images, and more particularly, to automatically generating a dynamic digital metadata record from digitized hardcopy prints.

BACKGROUND OF THE INVENTION

Consumers today are switching from film-based chemical photography to digital photography in increasing numbers. The instantaneous nature of image capture and review, the ease of use, numerous output and sharing options, multimedia capabilities, and on-line and digital media storage capabilities have all contributed to consumer acceptance of this technological advancement. A hard drive, on-line account, or a DVD can store thousands of images, which are readily available for printing, transmitting, conversion to another format, conversion to another media, or used to produce an image product. Since the popularity of digital photography is relatively new, the majority of images retained by a typical consumer usually takes the form of hardcopy media. These legacy images may span decades of time and have a great deal of personal and emotional importance to the collection's owner. In fact, these images often increase in value to their owners over time. Thus, even images that were once not deemed good enough for display are now cherished. These images are often stored in boxes, albums, frames, or even their original photofinishing return envelopes.

Getting a large collection of legacy images into a digital form is often a formidable task for a typical consumer. The user is required to sort through hundreds of physical prints and place them in some relevant order, such as chronology or sorting by event. Typically, events are contained on the same roll of film or across several rolls of film processed in the same relative time frame. After sorting the prints, the user would be required to scan the media to make a digital version of the image. Scanning hardcopy image media such as photographic prints to obtain a digital record is well known. Many solutions currently exist to perform this function and are available at retail from imaging kiosks and digital minilabs and at home with "all-in-one" scanner/printers or with personal computers equipped with media scanners. Some media scanning devices include media transport means, simplifying the task of scanning hardcopy media. Using any of these systems requires that the user spend time or expense converting the images into a digital form only to be left with the problem of providing some sort of organizational structure to the collection of digital files generated.

The prior art teaches sorting scanned hardcopy images by physical characteristics and also utilizing information/annotation from the front and back of the image. This teaching allows grouping images in a specific chronological sequence, which may be adequate for very large image collections. However, if the images are scanned and organized, but are not rotated correctly, they will be recorded to CD/DVD or some other suitable storage media in the wrong orientation. This results in a less than ideal experience for the end user.

Accordingly, if additional metadata can be acquired from an image, there are several improvements to the image that can be made. For example, in addition to organization, metadata indicating that an image is black-and-white vs. color can be used to correct the orientation of the image. Also, if we know where the border or the image is, the border or the image can be used to properly restore (reverse dye-fade) the image.

However, a system does not exist to rapidly convert large volumes of hardcopy media images into digital form and dynamically create a complete representation of the metadata of the image, which can then be used for organization, orientation, restoration, archiving, presentation, enhancing, etc. Such a system would provide a way for a consumer to easily and affordably obtain a digital version of a hardcopy image collection that will be a high quality presentation provided with a meaningful context. While some prior art techniques may provide some help in organizing images, there is still a need to provide further efficient techniques for automatically organizing images into further defined groupings.

SUMMARY OF THE INVENTION

In general terms, the present invention relates to digital images, and more particularly, to automatically generating a dynamic digital metadata record from digitized hardcopy prints.

One aspect of the present invention is a method for automatically generating a dynamic set of metadata from digitized hardcopy media, including scanning an image side and a non-image side of a plurality of hardcopy media and creating a dynamic digital metadata record of each of the plurality of hardcopy media for manipulating each of the plurality of hardcopy media.

Another aspect of the present invention is a system for automatically generating a dynamic set of metadata from digitized hardcopy media, including a scanner for converting an image side and a non-image side of a plurality of hardcopy media into digitized data, and a computer, such as a central computer, for creating a dynamic digital metadata record for of each of the plurality of hardcopy media and for manipulating each of the plurality of hardcopy media.

Another aspect of the present invention is an article of manufacture including a program storage medium readable by a computer, the medium tangibly embodying one or more programs of instructions executable by the computer to perform a method for automatically generating a dynamic set of metadata from digitized hardcopy media, including scanning an image side and a non-image side of a plurality of hardcopy media, and creating a dynamic digital metadata record of each of the plurality of hardcopy media for manipulating each of the plurality of hardcopy media.

BRIEF DESCRIPTION OF THE DRAWINGS

The invention may be more completely understood by considering the detailed description of various embodiments of the invention which follows in connection with the accompanying drawings. Referring now to the drawings in which like reference numbers represent corresponding parts throughout.

FIG. 6 is an illustration of sample values for dynamically derived metadata;

DETAILED DESCRIPTION OF THE INVENTION

Figure 1:
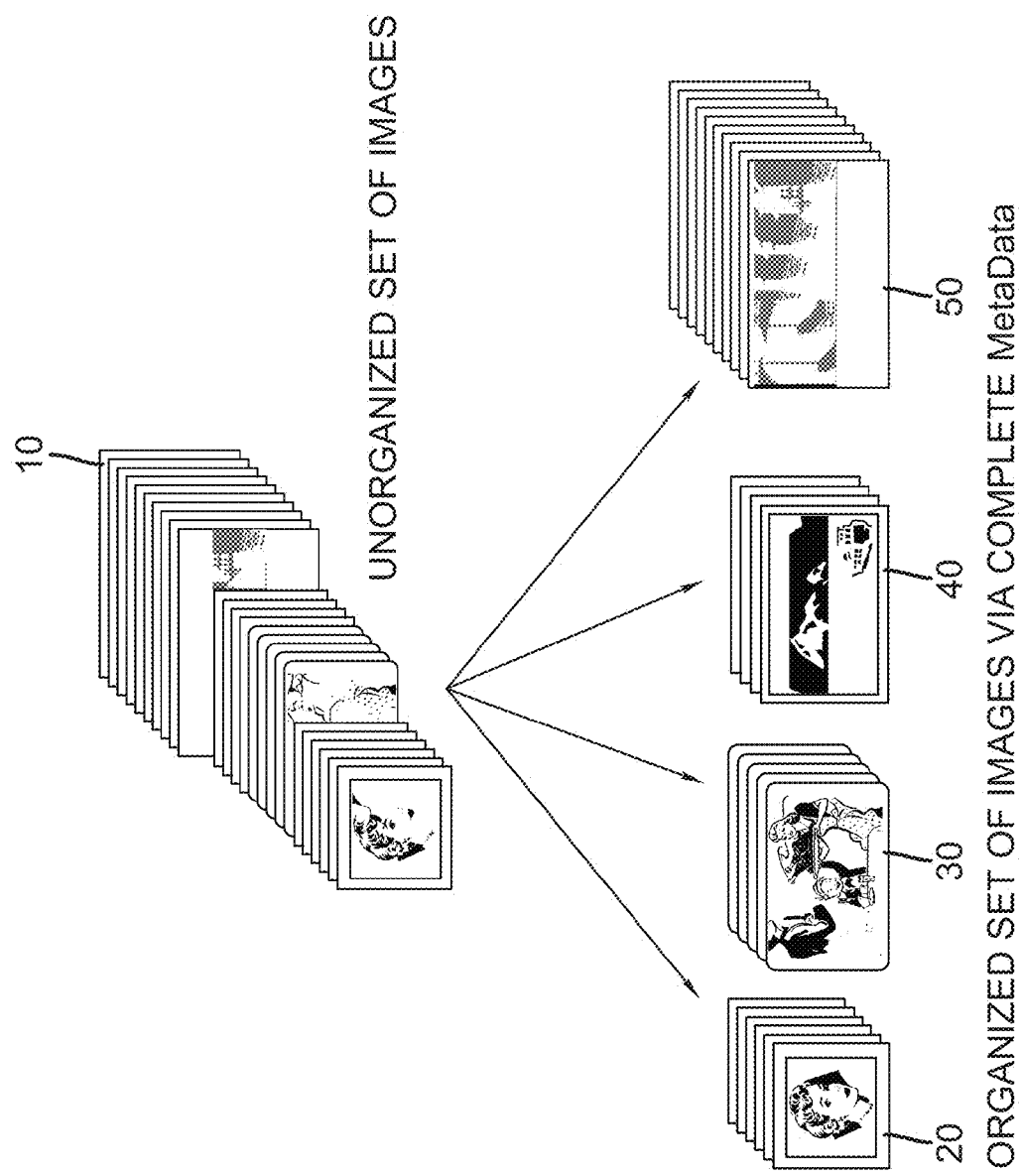
FIG. 1 illustrates a system that sorts hardcopy media images using the physical characteristics obtained from the image bearing hardcopy media.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

FIG. 1 illustrates one technique to sort hardcopy media images using the physical characteristics obtained from the image bearing hardcopy media. Hardcopy media collections include, for example, optically and digitally exposed photographic prints, thermal prints, electro-photographic prints, inkjet prints, slides, and negatives. Over time, hardcopy media collections grow and media of various forms and formats are added to various consumer selected storage techniques such as boxes, albums, file cabinets, and the like. Some users keep the photographic prints, index prints, and film negatives from individual rolls of film in their original photofinishing print return envelopes. Other users remove the prints and they become separated from index prints and film negatives and become combined with prints from other rolls.

Over time, these collections become large and unwieldy. Users typically store these collections in boxes and it is difficult to find and gather images from certain events or time eras. It can require a significant time investment for the user to locate their images given the sorting requirement they may have at that time. For example, if you were looking for all images of your children, it would be extremely difficult to manually search your collection and look at each image to determine if it includes your child. If you are looking for images from the 1970s, you would have a very difficult process once again to look at the image (either the front or the back) to find the year it was taken.

These unorganized collections of hardcopy media 10 also consist of print media of various sizes and formats. This unorganized collection 10 can be converted to digital form with a media scanner capable of duplex scanning (not shown). If the hardcopy media 10 is provided in a "loose form," such as with prints in a shoebox, it is preferable to use a scanner with an automatic print feed and drive system. If the hardcopy media 10 is provided in albums or in frames, a page scanner or digital copy stand should be used so as not to disturb or potentially damage the hardcopy media.

Once digitized, the resulting digitized images are separated into designated subgroups 20, 30, 40, 50 based on physical size and format determined from the image data recorded by the scanner. Existing media scanners, such as the KODAK i600 Series Document Scanners, automatically transport and duplex scan hardcopy media, and include image-processing software to provide automatic de-skewing, cropping, correction, text detection, and Optical Character Recognition (OCR). The first subgroup 20 represents images of bordered 3.5"×3.5" (8.89 cm×8.89 cm) prints. The second subgroup 30 represents images of borderless 3.5"×5" (8.89 cm×12.7 cm) prints with round corners. The third subgroup 40 represents images of bordered 3.5"×5" (8.89 cm×12.7 cm) prints. The fourth subgroup 50 represents images of borderless 4"×6" (10.16 cm×15.24 cm) prints. Even with this new organizational structure, any customer provided grouping or sequence of images is maintained as a sort criterion. Each group, whether envelope, pile or box, should be scanned and tagged as a member of "as received" group and sequence within the group should be recorded.

Figure 2:
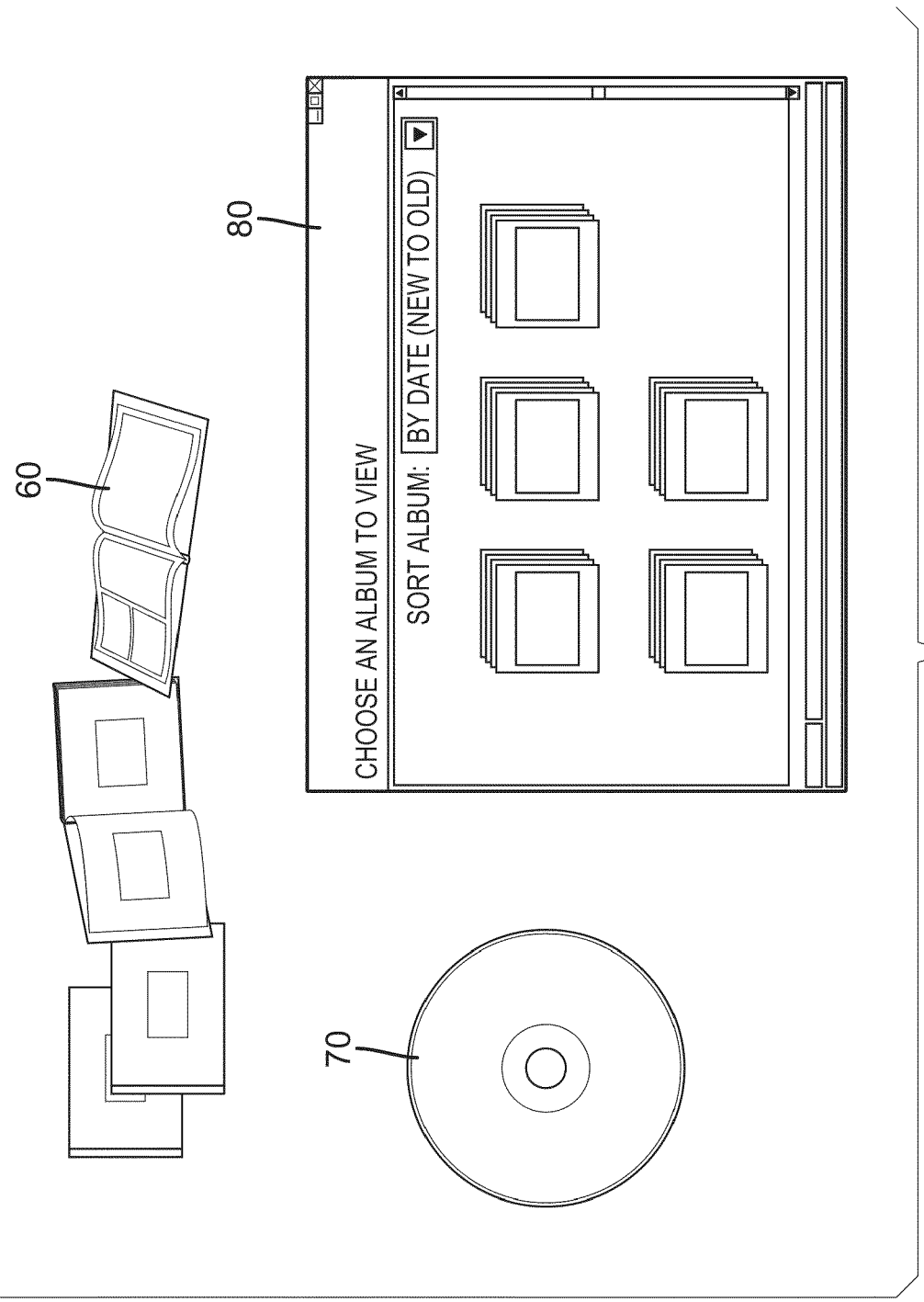
FIG. 2 illustrates other types of hardcopy media collections such as photo books, archive CDs and online photo albums.

FIG. 2 illustrates other types of hardcopy media collections such as photo books, archive CDs and online photo albums. A picture book 60 contains hardcopy media printed using various layouts selected by the user. The layouts can be by date, event, etc. Another type of hardcopy media collection is the Picture CD 70 having images stored on the CD in various formats. These images could be sorted by date, event, or any other criteria that the user can apply. Another type of hardcopy media collection is an online gallery of images 80, which is typically stored in an online (Internet based) or offline (local storage). All of the collections in FIG. 2 are similar, but the storage mechanism is different. For example, the picture book 60 includes a printed page(s), the Picture CD 70 stored information on a CD, and the online gallery of images 80 is stored in magnetic storage.

Figure 3:
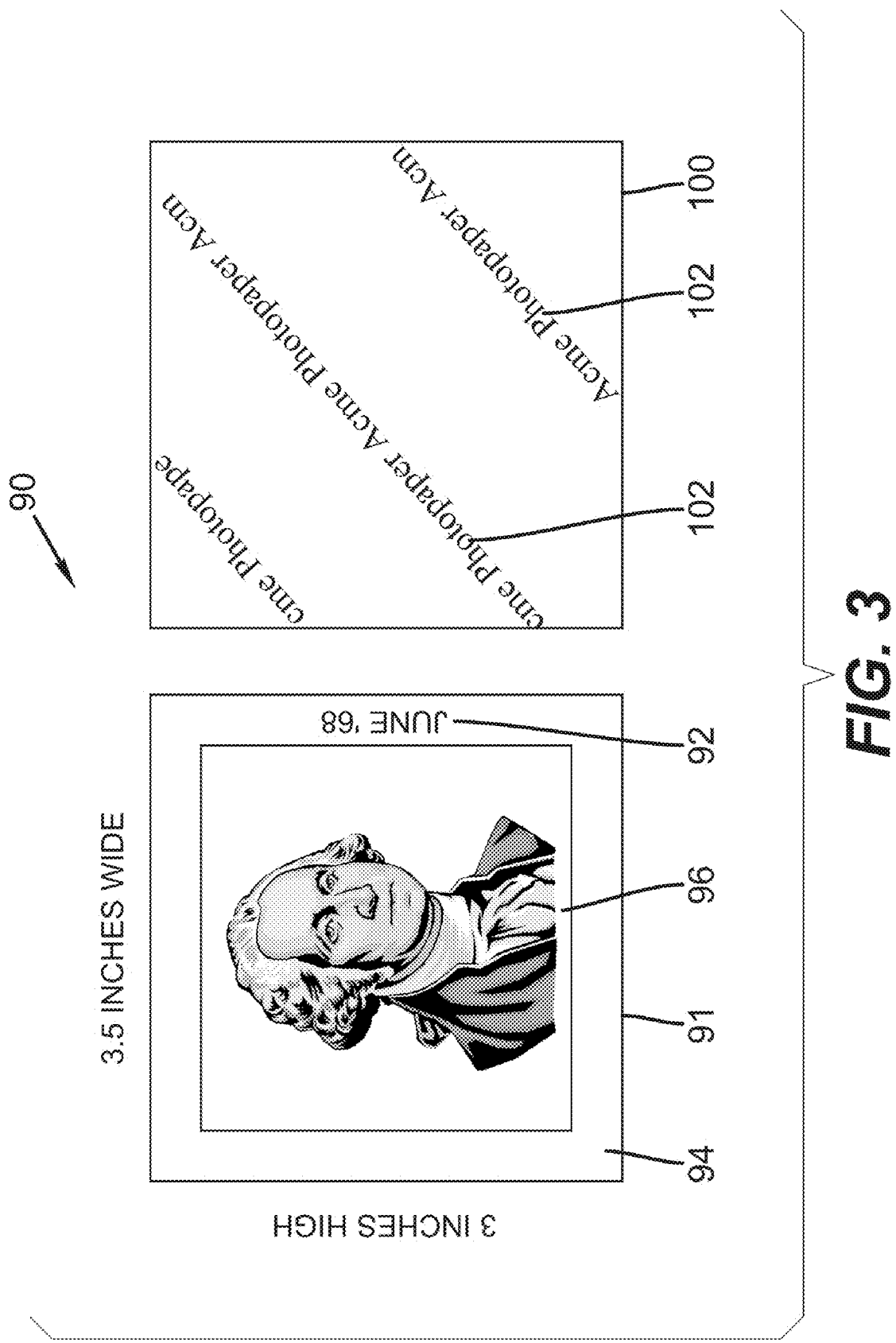
FIG. 3 is an illustration of an image and a non-image surface of a hardcopy media image including an ink printed photofinishing process applied stamp including the date of image processing.

FIG. 3 illustrates an example of a hardcopy imaging media that includes both the image and non-image surfaces. Photographic print media 90 contains information that can be instantly recorded (i.e., size, aspect ratio, etc.) and information that can be derived (black-white/color, border, etc.). Together this information can be gathered as metadata for the print media 90 and stored along with the print media 90. This metadata contains intrinsic information about the print media 90 that can be formed into a type of organizational structure, such as a dynamic digital metadata record, to be used by the user to locate a specific event, time era, or group of prints that meet some criteria. For example, a user may want to collect all of the users' prints from the 1960s and 1970s so as to apply a dye fade reversal process to restore the prints. The user may want all pictures of your wedding or some other special occasion. If the prints contain this metadata in a digital form, the information can be used for these purposes.

This dynamic digital metadata record is an organizational structure that becomes even more important as image collections grow in size and time frame. If the hardcopy image collection is large, including thousands of images, and is converted to digital form, an organizational structure such as a file structure, searchable database, or navigational interface is required in order to establish usefulness.

Photographic print media and the like have an image surface 91, a non-image surface 100, and often include a manufacturer's watermark 102 on the non-imaging surface 100 of the print media 90. The manufacturer of the print media 90 prints watermarks 102 on "master rolls" of media, which are slit or cut into smaller rolls suitable for use in photo processing equipment such as kiosks, minilabs, and digital printers. Manufacturers change watermarks 102 from time to time as new media types with new characteristics, features and brand designations are introduced to the market. Watermarks 102 are used for promotional activities such as advertising manufacturer sponsorships, to designate special photofinishing processes and services, and to incorporate market specific characteristics such as foreign language translations for sale in foreign markets. Watermarks 102 are typically non-photographically printed on the non-image surface 100 of the print media 90 with a subdued density and can include text of various fonts, graphics, logos, color variations, multiple colors, and typically run diagonally to the media roll and cut print shape.

Manufacturers also include slight variations to the master roll watermarks such as adding a line above or below a designated character in the case of an alphanumeric watermark. This coding technique is not obvious or even apparent to user, but is used by the manufacturer in order to monitor manufacturing process control or to identify the location of a manufacturing process problem if a defect is detected. Different variations are printed at set locations across the master media roll. When finished rolls are cut from the master roll they retain the specific coded watermark variant applied at that relative position along the master roll. In addition, manufacturers maintain records of the various watermark styles, coding methodologies, and when specific watermark styles were introduced into the market.

In testing with actual consumer hardcopy media, it has been determined that watermark variations, including manufacturer watermarks with special process control coding, provided a very effective means to determine original film roll printing groupings. Once hardcopy media images are separated into original roll printing groups, image analysis techniques can be used to further separate the roll groupings into individual events. Watermark analysis can also be used to determine printing sequence, printing image orientation, and the time frame in which the print was generated.

A typical photofinishing order, such as processing and printing a roll of film, will, under most circumstances, be printed on media from the same finished media roll. If a media roll contains a watermark with a manufacturer's variant code and is used to print a roll of film negatives, the resulting prints will have a watermark that will most likely be unique within a user's hardcopy media collection. An exception to this may be if a user had several rolls of film printed at the same time by the same photofinisher, as with film processed at the end of an extended vacation or significant event. However, even if the photofinisher had to begin a new roll of print paper during printing a particular customer's order, it is likely that the new roll will be from the same batch as the first. Even if that is not the case, the grouping of the event such as a vacation into two groups on the basis of differing back prints is not catastrophic.

The media manufacturer, on an ongoing basis, releases new media types with unique watermarks 102 to the market. Digital image scanning systems (not shown) can convert these watermarks 102 into digital records, which can be analyzed using Optical Character Recognition (OCR) and/or digital pattern matching techniques. This analysis is directed at identifying the watermark so that the digital record can be compared to the contents of Look Up Tables (LUT's) provided by a manufacturer of the media. Once identified, the scanned watermark can be used to provide a date of manufacture or sale of the print media. This date can be stored in the dynamic digital metadata record. The image obtained from the image surface 91 of the hardcopy media 90 is sometimes provided with a date designation 92 such as the markings from a camera date back, which can be used to establish a time frame for the scanned hardcopy media image 96 without intervention from the user.

If a hardcopy media 90 has an unrecognized watermark style, that watermark pattern is recorded and stored as metadata in the dynamic digital metadata record and later used for sorting purposes. If a photofinisher or user applied date or other information indicative of an event, time frame, location, subject identification, or the like is detected, that information would be incorporated into the LUT and used to establish a chronology or other organizational structure for subsequent images including the previously unidentified watermark. If a user or photofinisher applied date is observed on that hardcopy media 90, that date can be added to the LUT. The automatically updated LUT can now use this new associated date whenever this unknown watermark style is encountered. This technique can be deployed to establish a relative chronology for hardcopy image collections that usually span decades.

Another technique uses the physical format characteristics of hardcopy media 90 that can be correlated to the film systems that were used to create them and the time frames that these film systems were in general use. Examples of these formats and related characteristics include the INSTAMATIC (a trademark of the Eastman Kodak Company) Camera and 126 film cartridge introduced in 1963 which produced 3.5 inch×3.5 inch (8.89 cm×8.89 cm) prints and was available in roll sizes of 12, 20, and 24 frames.

The Kodak Instamatic camera 110 film cartridge was introduced in 1972 and produced 3.5"×5" (8.89 cm×12.7 cm) prints and was available in roll sizes: 12, 20, and, 24 frames. The Kodak Disc camera and Kodak Disc film cartridge was introduced in 1982 and produced 3.5"×4.5" (8.89 cm×11.43 cm) prints with 15 images per Disc. Kodak, Fuji, Canon, Minolta and Nikon introduced the Advanced Photo System (APS) in 1996. The camera and film system had the capability for user selectable multiple formats including Classic, HDTV, and Pan producing prints sizes of 4"×6", 4"×7", and 4"×11" (10.16 cm×15.24 cm, 10.16×17.78 cm, 10.16×27.94 cm). Film roll sizes were available in 15, 25, and 40 frames and index prints containing imagettes of all images recorded on the film were a standard feature of the system.

The APS system has a date exchange system allowing the manufacturer, camera, and photofinishing system to record information on a clear magnetic layer coated on the film. An example of this data exchange was that the camera could record the time of exposure and the user selected format on the film's magnetic layer which was read and used by the photofinishing system to produce the print in the desired format and record the time of exposure, frame number, and film roll ID# on the back of the print and on the front surface of a digitally printed index print. 35 mm photography has been available in various forms since the 1920's to present and has maintained popularity until the present in the form of "One Time Use Cameras." 35 mm systems typically produce 3.5" (8.89 cm)×5" (12.7 cm) or 4" (10.16 cm)×6" (15.24 cm). Prints and roll sizes are available in 12, 24 and 36 frame sizes. "One Time Use Cameras" has the unique characteristic in that the film is "reverse wound" meaning that the film is wound back into the film cassette as pictures are taken producing a print sequence opposite to the normal sequence. Characteristics such as physical format, expected frame count, and imaging system time frame can all be used to organize scanning hardcopy media into meaningful events, time frames, and sequences.

As with traditional photography instant photography systems also changed over time, for example, the Instant film SX-70 format was introduced in the 1970's, the Spectra system, Captiva, I-Zone systems were introduced in the 1990's, each of which had a unique print size, shape, and border configuration.

In FIG. 3, some of the above mentioned characteristics are shown. Image surface 91 of the hardcopy imaging media 90 is illustrated. The image surface 91 indicates a date code 92 printed in the border 94. Centered on the image surface 91 is actual image data 96 of the hardcopy imaging media 90. In one embodiment, the non-image surface 100 includes a common configuration representing a watermark 102. In this embodiment, lines of evenly spaced text and/or graphics run diagonally across the back surface of hardcopy imaging media, representing the watermark 102. In the embodiment, the watermark 102 includes a repeating text "Acme Photopaper."

Figure 4:
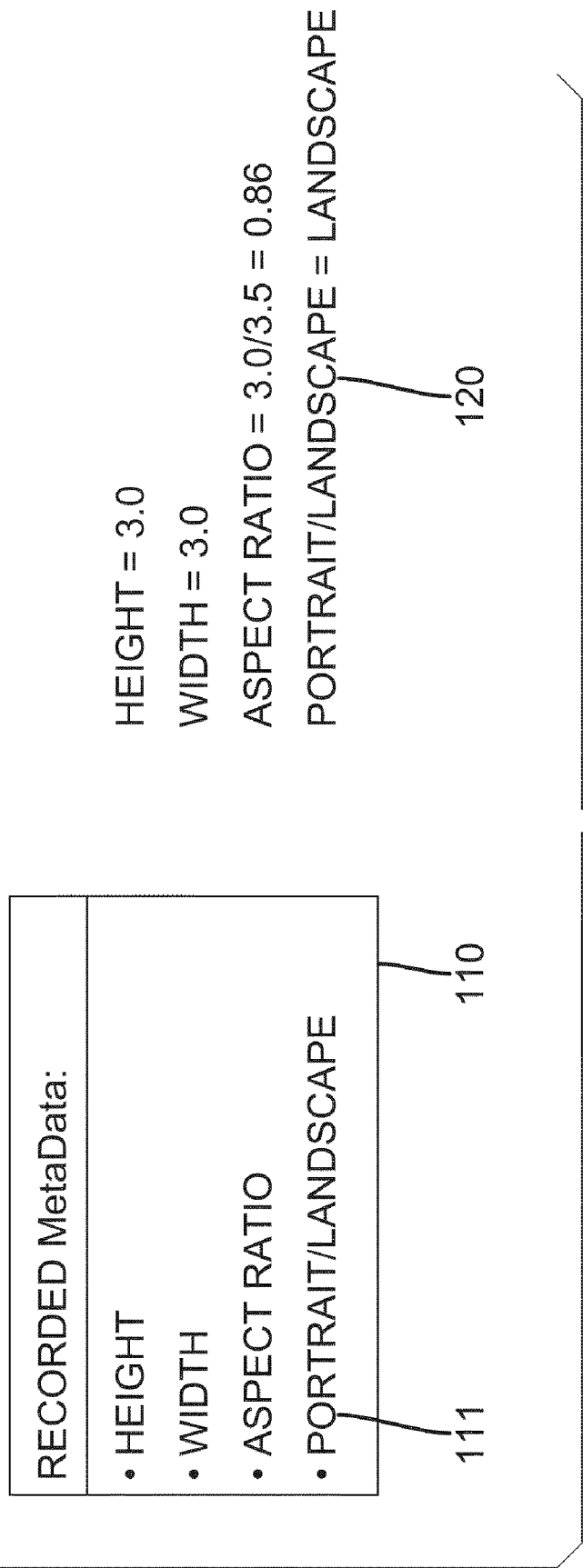
FIG. 4 is an illustration of recorded metadata dynamically extracted from the surfaces of a hardcopy media image.

FIG. 4 illustrates recorded metadata 110 that is dynamically extracted from the hardcopy media. The height, width, aspect ratio, and the orientation (portrait/landscape) for the hardcopy media can be extracted and recorded quickly and dynamically from the image and non-image surfaces of the hardcopy media without any derived calculations. The number of fields 111 correlating to the recorded metadata 110 can vary depending on, but not limited to, the characteristics of the hard copy media, such as format, time period, photofinish, manufacturer, watermark, shape, size and other distinctive markings of the hardcopy media. Accordingly, the recorded metadata 110 is dynamically acquired and subsequently stored in a dynamic digital metadata record. Sample values 120 for the recorded metadata fields 111 are shown adjacent to the recorded metadata 110.

Figure 5:
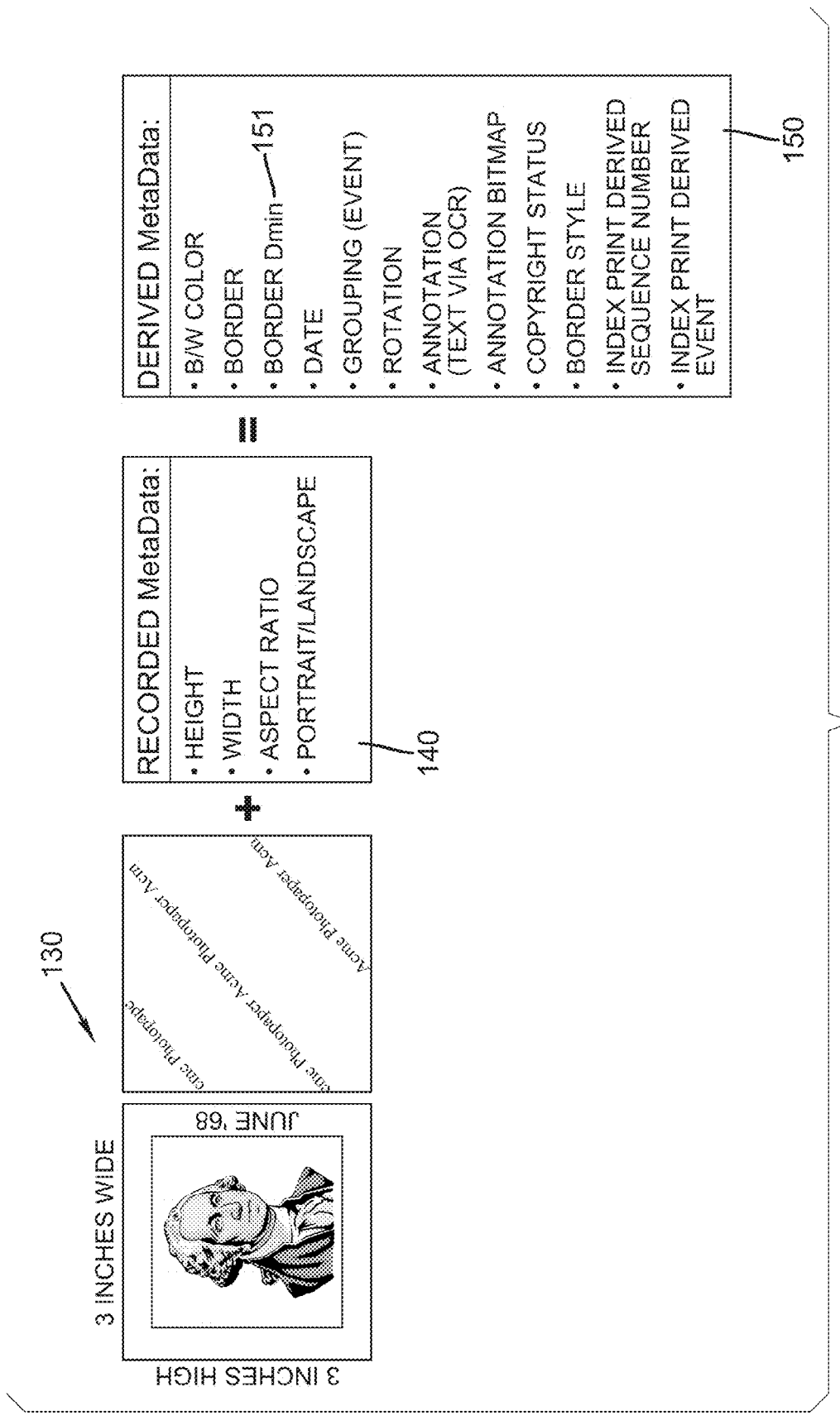
FIG. 5 is an illustration of metadata dynamically derived from the combination of image and non-image surfaces and recorded metadata of a hardcopy media.

FIG. 5 is an illustration of metadata 150 dynamically derived from the combination of image and non-image surfaces and recorded metadata 140 of a hardcopy media 130. The image and non-image surface of hardcopy media 130 is analyzed using various methods and the resulting data is combined with the dynamically recorded metadata 140 to produce dynamically derived metadata 150. The derived metadata 150 requires several analysis algorithms to determine values for metadata fields 151 forming the dynamically derived metadata 150. The analysis algorithms include, but are not limited to, border detectors, black and white color detectors and orientation detectors. The number of fields 151 correlating to the derived metadata 150 can vary depending on, but not limited to, the results of the algorithms, characteristics of the hard copy media, as well as any additional information supplied by human or mechanical techniques as will be discussed in the following paragraphs. Accordingly, the derived metadata 150 is dynamically acquired and subsequently stored in a dynamic digital metadata record.

FIG. 6 is an illustration of sample values 170 for dynamically derived metadata 160. The derived metadata 160 includes sample values 161 for the color, border, border density, date, grouping, rotation, annotation, annotation bitmap, copyright status, border style, index print derived sequence, index print derived event, etc. However, the derived metadata 160 is not limited to these fields and any suitable fields can be dynamically created depending on at least the results of the algorithms, characteristics of the hard copy media, as well as any additional information supplied by human or mechanical techniques, such as specific time era, subsequent pertinent information related to an event, correlated events, personal data, camera speeds, temperature, weather conditions, geographical location, etc.

Figure 7:
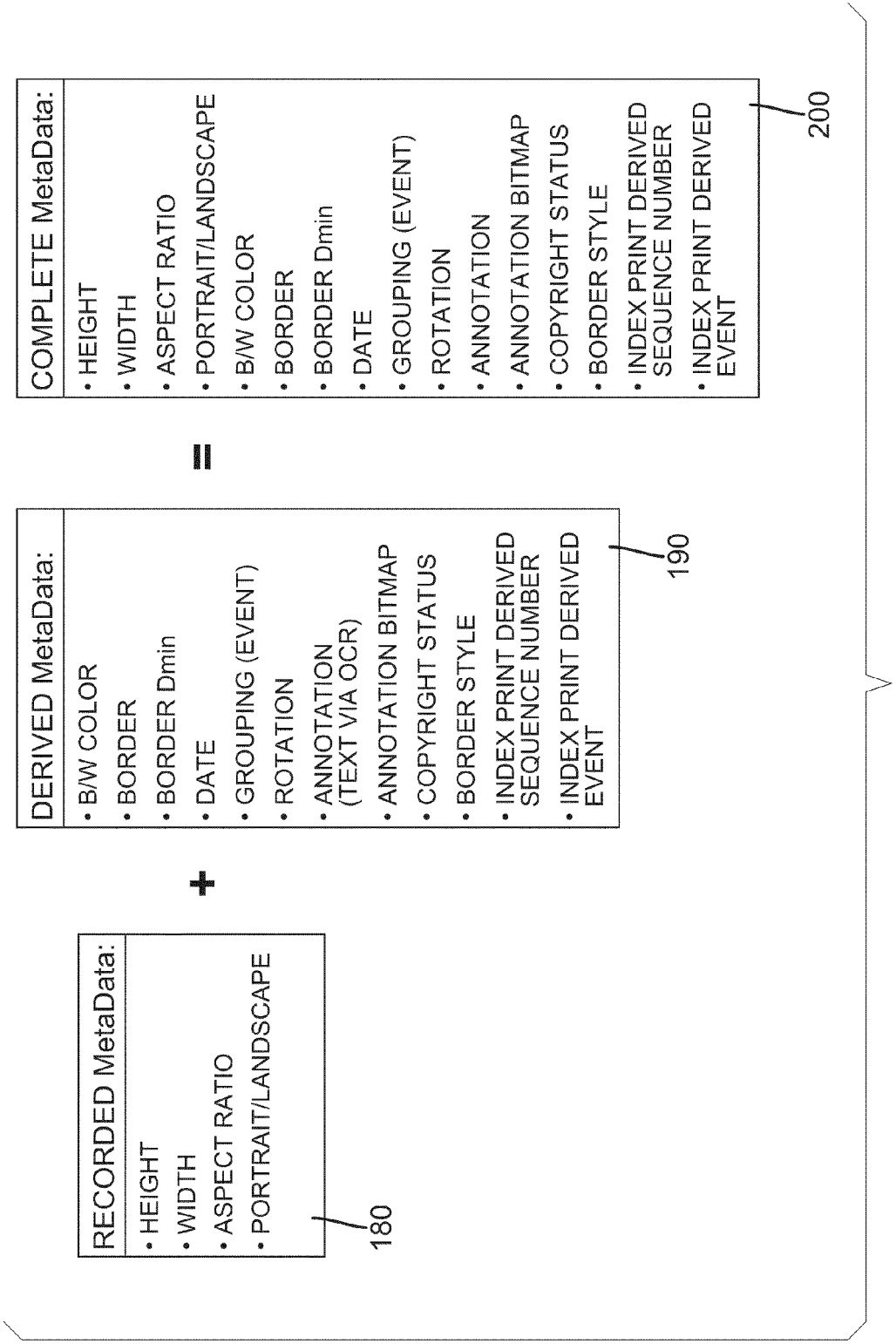
FIG. 7 is an illustration of the combination of the recorded metadata and the derived metadata that results in the complete metadata representation.

FIG. 7 is an illustration of the combination of dynamically recorded metadata 180 and the dynamically derived metadata 190. This combination produces a complete metadata record, also referred to as the dynamic digital metadata record 200, for the hardcopy media. The complete metadata record 200, referred to as the dynamic digital metadata record, contains all information about a digitized hard copy media. One or more complete metadata records 200 can be queried to at least group and correlate associated images given different search criteria.

For example, once every hardcopy media item has been scanned and an associated complete metadata record 200 has been created, powerful search queries can be constructed to allow the hardcopy media to be organized in different and creative ways. Accordingly, large volumes of hardcopy media images can be rapidly converted into digital form and a digital metadata record 200 is dynamically created to completely represent the metadata of the image. This dynamic digital metadata record 200 can then be used for, but not limited to, manipulating the digitized hardcopy images, such as organizing, orientating, restoring, archiving, presenting and enhancing digitized hardcopy images.

Figure 8A:
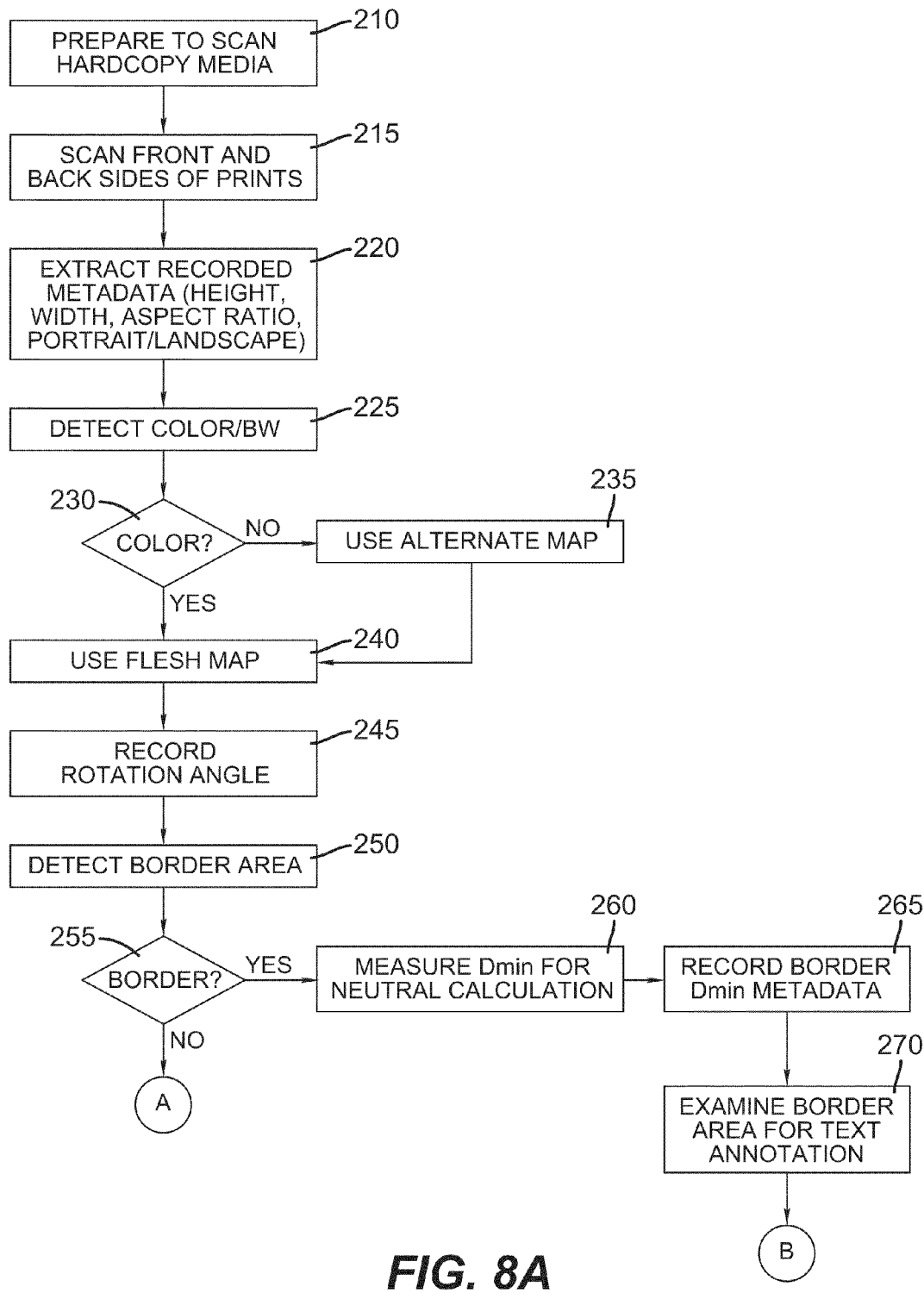
FIGS. 8A and 8B are flow charts illustrating the sequence of operation for creating the recorded, derived, and complete metadata representations.
Figure 8B:
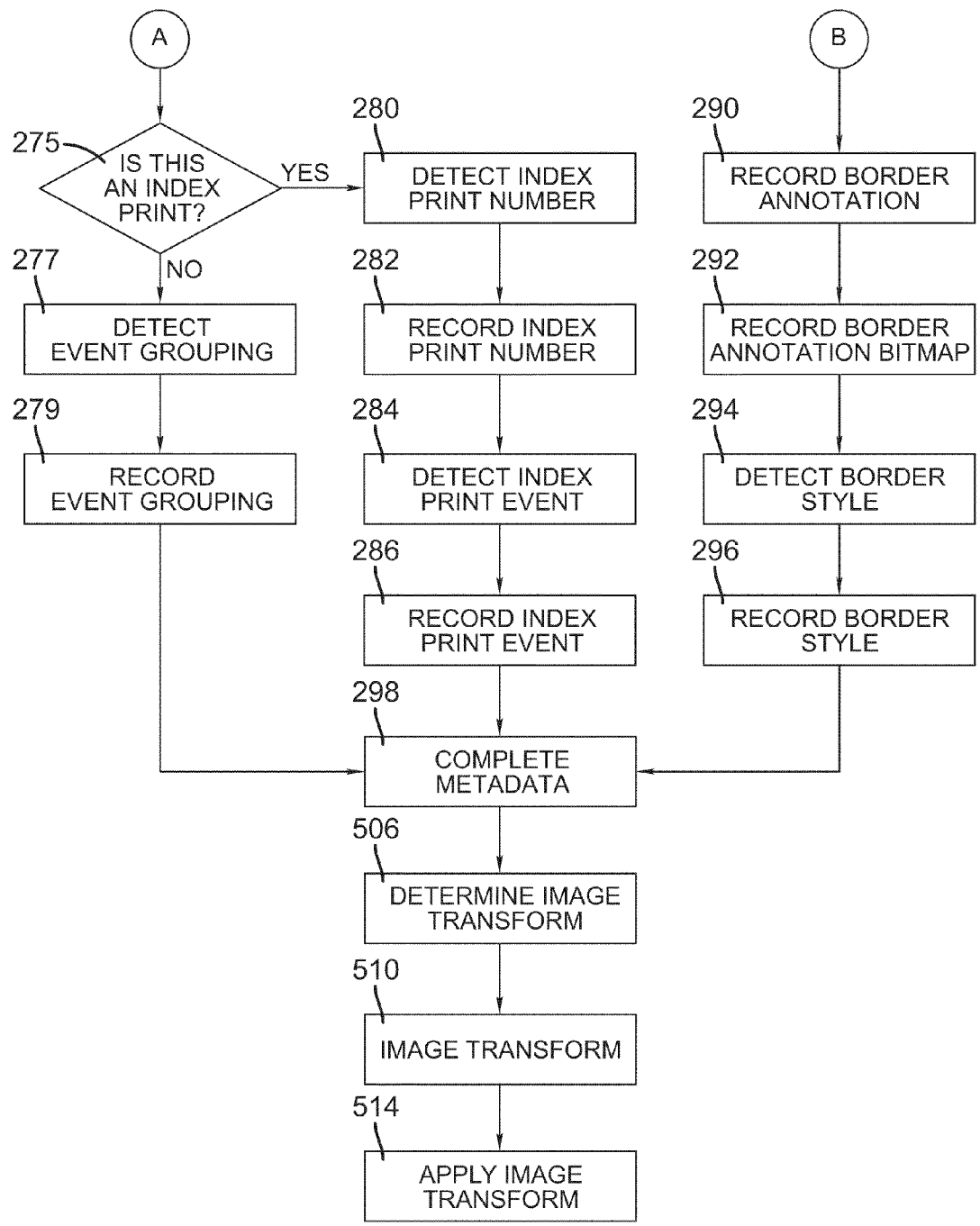

FIGS. 8A and 8B are flow charts illustrating the sequence of operation for creating the recorded, derived, and complete metadata representations. Hardcopy media can include one or more of the following forms of input modalities: prints in photofinishing envelopes, prints in shoeboxes, prints in albums, and prints in frames. However, the embodiment is not limited to the above modalities, and other suitable modalities can be used.

Referring now to FIGS. 8A and 8B, a description of the operation of a system according to the present invention will now be described. FIGS. 8A and 8B are graphic depictions of a flowchart illustrating the sequence of operations for hardcopy image scanning and complete metadata creation. The hardcopy media can include any or all of the following forms of input modalities, such as prints in photofinishing envelopes, prints in shoeboxes, prints in albums, and prints in frames.

The hardcopy media can be scanned by a scanner in any order in which the media was received. The media is prepared 210 and the front and back of the media is scanned 215. The scanner creates information in the image file that can be used to extract the recorded metadata information 220. By using a Color/Black and White algorithm 225, a decision point is created 230 and the appropriate color map (non-flesh, i.e. black and white) 235, (flesh color) 240 is used to find, but is not limited to, faces in the image. If the map is rotated in orientations of 0, 90, 180, 270 degrees with a face detector, the orientation of the image can be determined and the rotation angle (orientation) is recorded 245. The orientation will be used to automatically rotate the image before it is written (useful before writing to a CD/DVD or displaying one or more images on a display).

Using a border detector 250, a decision point is made if a border 255 is detected. If a border is detected, the minimum density (Dmin) 260 can be calculated by looking in the edge of the image near the border. After the border minimum density is calculated, it is recorded 265 in the derived metadata. Text information/annotation written in the border can be extracted 270. OCR can be used to convert the extracted text information to ASCII codes to facilitate searching. The border annotation is recorded 290 into the derived metadata. The border annotation bitmap can also be recorded 292 into the derived metadata. The border style such as scalloped, straight, rounded is detected 294 and recorded 296 into the derived metadata. If the image is an index print 275, information such as the index print number can be detected 280 and recorded 282. Index print events can also be detected 284 and recorded 286. If the image is not an index print 275, information such as a common event grouping can be detected 277 and recorded 279. The common event grouping is one or more images originating from the same event or a group of images having similar content. For example, a common event grouping can be one or more images originating from a fishing trip, birthday party or vacation for a single year or multiple years. The complete set of metadata 298 (i.e., digital dynamic metadata record) is created by combining the recorded and derived metadata.

In a determine image transform step 506, the derived metadata 298 is used to generate an image transform 510. The image transform 510 is an operation (executed by software or hardware) that either re-arranges or modifies the pixel values of an image. In the present embodiment, the determine image transform step 506 uses derived metadata information 298 originally derived by scanning the non-image surface 100 of print media 90 to determine the image transform 510.

The determine image transform step 506 can also use derived metadata 298 associated with other images from the same event grouping to determine the image transform 510. This is because an event grouping is detected 277 using watermarks 102 and recorded 279, as described above. In addition, the determine image transform 506 step can also use image information (i.e. pixel values) from the image and other image(s) from the same event grouping to determine the image transform 510.

For example, the image transform 510 can be used to determine the orientation of an image based on the derived metadata associated with that image and the derived metadata associated with other imaged from the same event grouping. The image's orientation indicates which one of the image's four rectangular sides is "up", from the photographer's point of view. An image having proper orientation is one that is displayed with the correct rectangular side "up".

More specifically, when large volumes of hardcopy images are scanned, it is very difficult for a user to ensure that each image is properly oriented. The task is even more difficult when hardcopy prints are stored loosely in a shoebox or the like. It is known to determine orientation of images based on looking for faces as discloses in U.S. Pat. No. 6,940,545 issued to Ray et al. and incorporated by reference herein, but only about 75% of images contain faces and automatic face detectors sometimes miss detecting faces even when they are present, or find false faces that are not actually in an image. Other methods of determining image orientation are based on finding sky or grass, but again many images do not contain these materials. The determine image transform 506 step uses the additional data from images with the same recorded event grouping 279 to avoid these pitfalls and determine an image transform 510 for orienting the image that has very good accuracy. For example, the determine image transform 506 step uses the method described in U.S. Pat. No. 5,642,443, titled "Whole Order Orientation Method and Apparatus" describes a method of considering an entire set of images in a consumer's order to determine the orientation of an entire order.

Figure 8C:
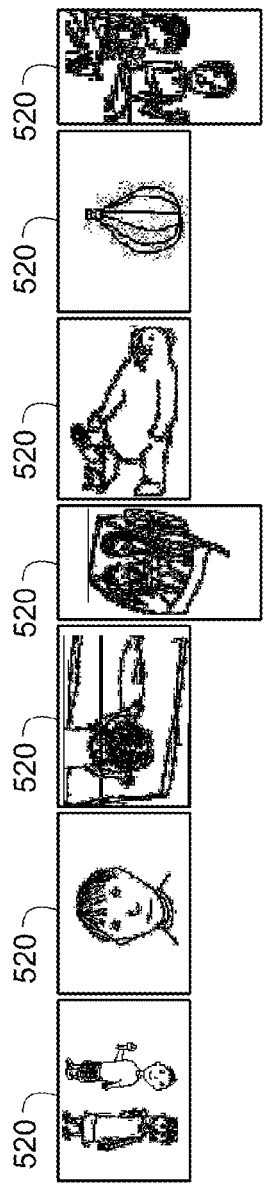
FIG. 8C is an illustrative set of images scanned in random orientation.
Figure 8D:
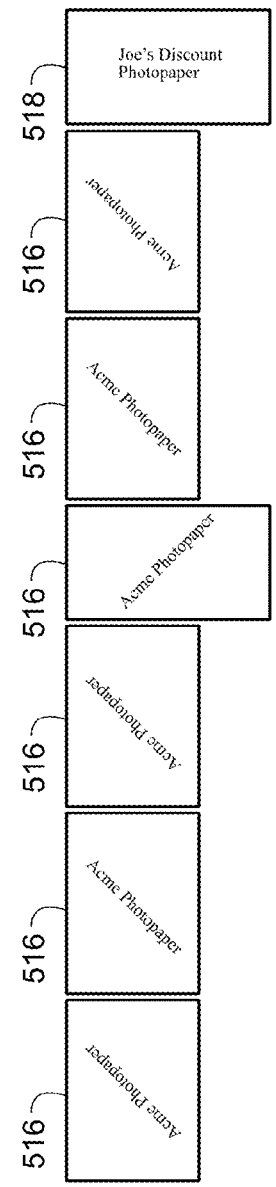
FIG. 8D illustrates watermarks corresponding to the images of FIG. 8C.

For example, FIG. 8C shows an illustrative set of scanned images 520 that are more or less randomly oriented. FIG. 8D shows the watermarks 516 and 518 associated with the scanned images 520 in FIG. 8C. As previously described, the watermarks 102 are compared and the images corresponding to the similar watermarks 516 are determined to be from a first event grouping, while the image associated with watermark 518 is determined to be from a second event grouping. In the determine image transform 506 step, the derived metadata 298 as well as image pixel data for images from the first event grouping are used to determine an image transform 510 for properly orienting the images.

Figure 8E:
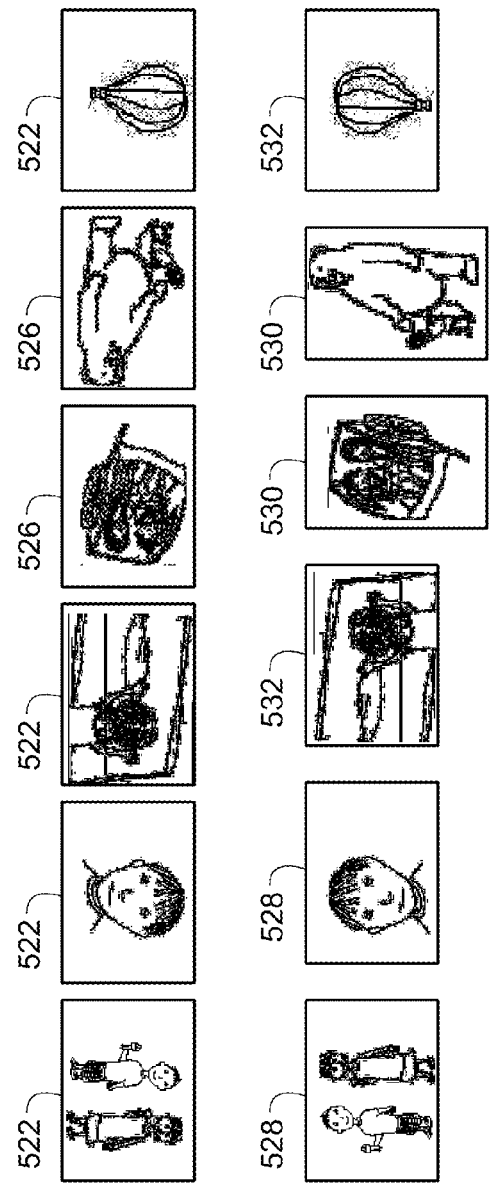
FIG. 8E illustrates images aligned based on watermark orientation.

The orientations of the watermarks 516 are determined so that the images from the first event grouping can be rotated to align the orientation of the images, as illustrated in FIG. 8E. At this point, images 522, which were captured in landscape format on the camera all have a common orientation (albeit in this case the images 522 are still upside-down). For cameras with a square format, the photographer had little incentive to rotate the camera. However, for image capture devices that produce rectangular hardcopy prints, the photographer sometimes rotates the image capture device by 90 degrees about the optical axis to capture a portrait format image (i.e. the image to be captured has a height greater than it's width) rather than a landscape format image (i.e. the image to be captured has a width greater than it's height).

Most (approximately 80%) images are captured in landscape format. Portrait images 526 have a different orientation than the landscape images 522. Generally, after accounting for the watermark's orientation, the landscape images 522 have a common orientation and the portrait images 526 have a common orientation but different from the landscape orientation. However, the portrait and landscape orientations can be the same. Those skilled in the art will recognize that showing the images with an aligned orientation as in FIG. 8E is merely for illustration. Software can keep track of the watermark orientation without explicitly rotating the images, for example, in cases where efficiency is desired.

Figure 8F:
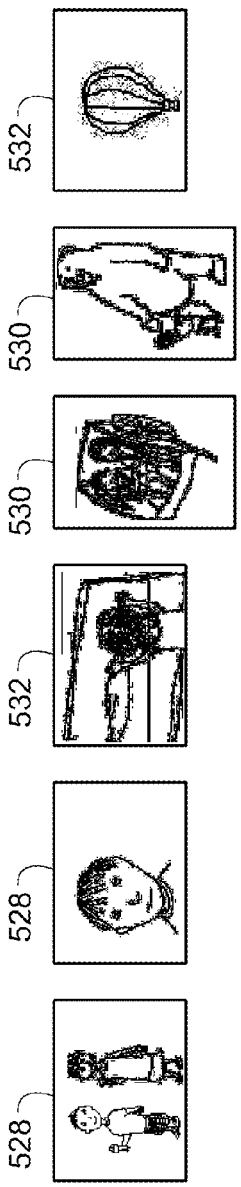
FIG. 8F illustrates images in proper orientation.

Analysis of the image pixel data and the derived metadata by the determine image transform 506 step determines the orientation of the images in the event grouping and the image transform 510 is required to properly orient each image. In operation, an algorithm first determines the default orientation of all the images in the event grouping. An algorithm such as the an algorithm disclosed in U.S. Pat. No. 5,642,443 issued to Goodwin et.al. and incorporated by reference herein, is useful for this step. Other features, such as faces (see U.S. Pat. No. 6,940,545) vanishing points as disclosed in U.S. Pat. No. 6,591,005 issued to Gallagher and incorporated by reference herein, can also be used to determine the default orientation. For the images shown in FIG. 8E, the default, or dominant, orientation is that of the landscape images 522, which further requires a rotation of 180 degrees. Certain images (e.g. the portrait images 526 from FIG. 8E) exhibit features or other evidence of having an orientation other than the default orientation. In the case of these portrait images 526, face detected is used to correct the image's orientation. FIG. 8F shows all the images from the first event grouping after the image transform is applied 514 (FIG. 8B) to properly orient the images. Both the landscape and the portrait images are properly oriented.

Accordingly, determining the orientation of images, such as images 528, 530, 532 of FIG. 8F, using only data from the image itself is extremely difficult. The present embodiment uses scanned information from the non-image surface 100 of the print media 90 to establish event groupings, and further to align the orientation of images within the event groupings 279. This allows the information (pixel data and derived metadata) from multiple images to contribute to creating an image transform 506.

The determine image transform step 506 is aided by using analysis of the image pixel data and the derived metadata 298 for multiple images in the same event grouping 279 for other purposes besides determining orientation. For example, when determining an image transform 514 for adjusting color balance, it is advantageous to consider multiple images from the same event grouping. The determine image transform 506 step analyses image data from images belonging to the same event grouping according to the methods described in U.S. Pat. No. 6,956,967 issued to Gindele et al. and incorporated by reference herein, which describes a method for improving color appearance using pixel data from multiple images from the same photographic film.

Figure 8G:
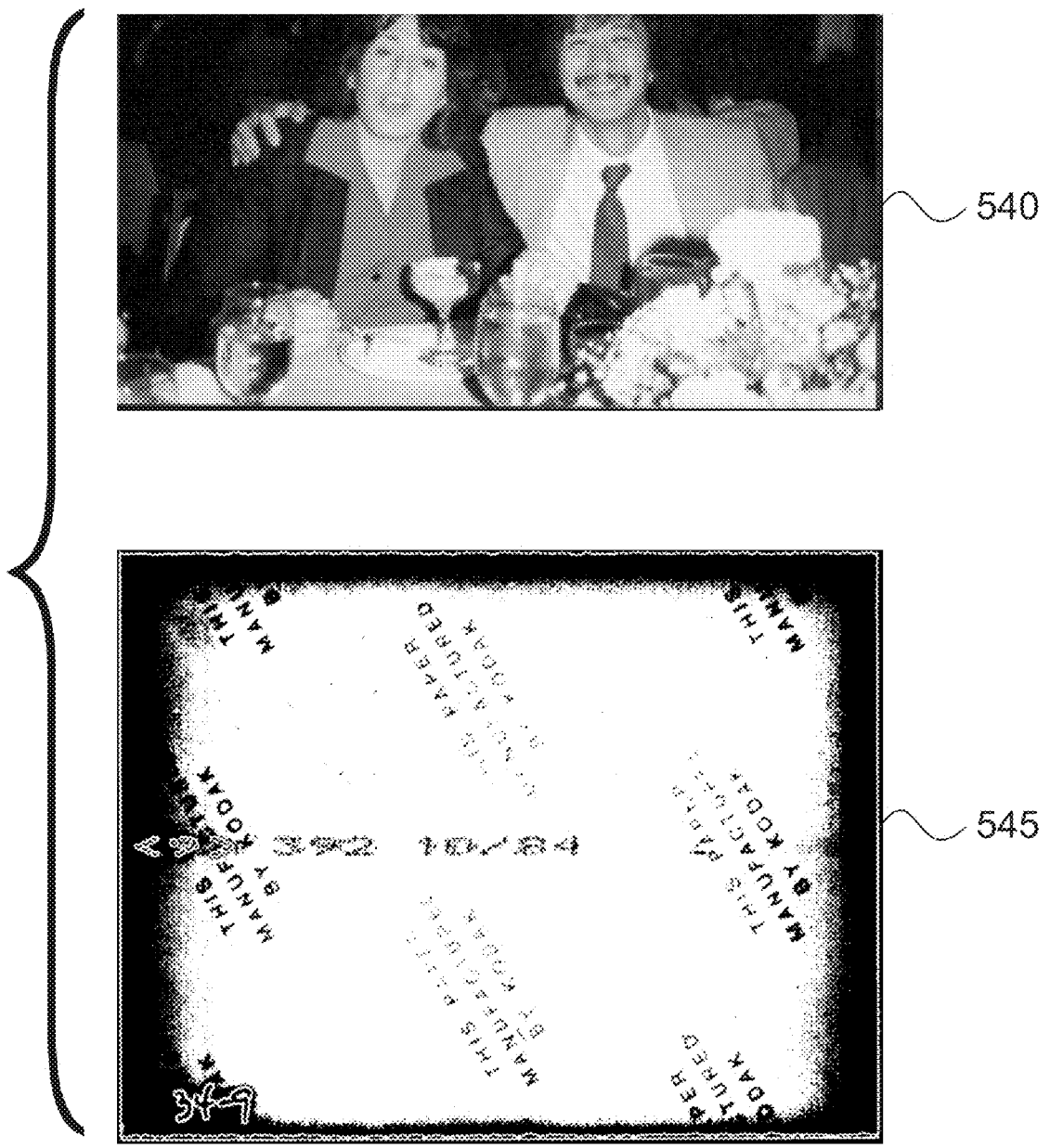
FIG. 8G illustrates a hardcopy that has been incorrectly cropped by the scanner and the associated scan of the back of the same media.

FIG. 8G is an example of the scanner cropping problem by using only the image side of a hardcopy media. A scanner has a set of fixed linear optical CCDs which are used to convert analog reflected light and generate a digital file. The scanner default background is black, therefore if the scanned media contains dark regions 540 then the media edge detection becomes more difficult as seen in 540. Since the back of the hardcopy media is typically not dark, the back of the image 545 can give a more reliable indication of the edges of the media. The edge indication is used to determine the physical height and width of the scanned media.

Figure 9:
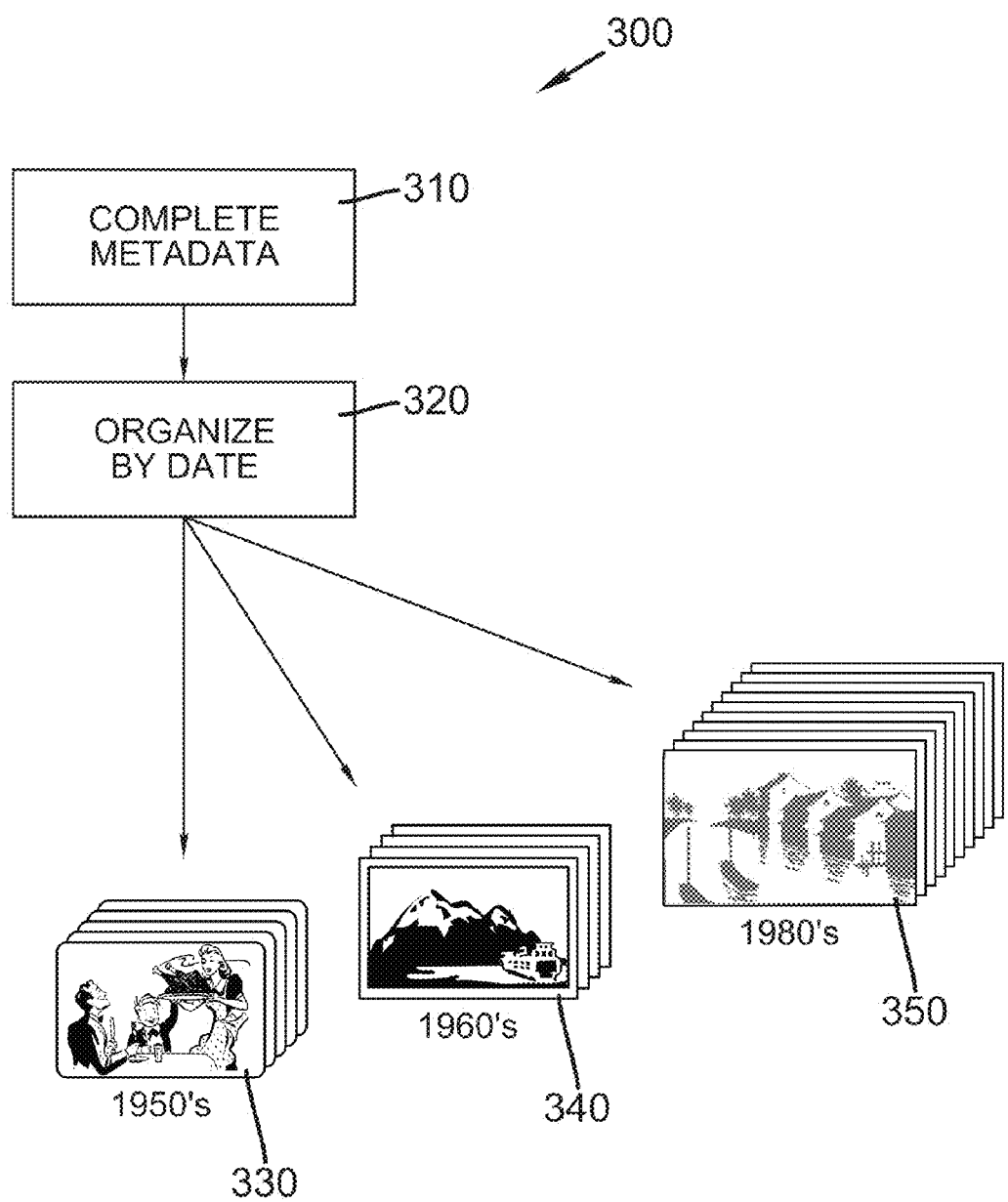
FIG. 9 is one embodiment of the uses of a dynamic digital metadata record.

FIG. 9 is one embodiment of a dynamic digital metadata record 300. A complete metadata record 310 can be used to organize, orient, restore, archive, present and enhance digitized hardcopy images. For example, by using a date stored by the complete metadata record 310, digitized hardcopy images can be organized by the date 320 into subgroups 330, 340, 350.

Figure 10:
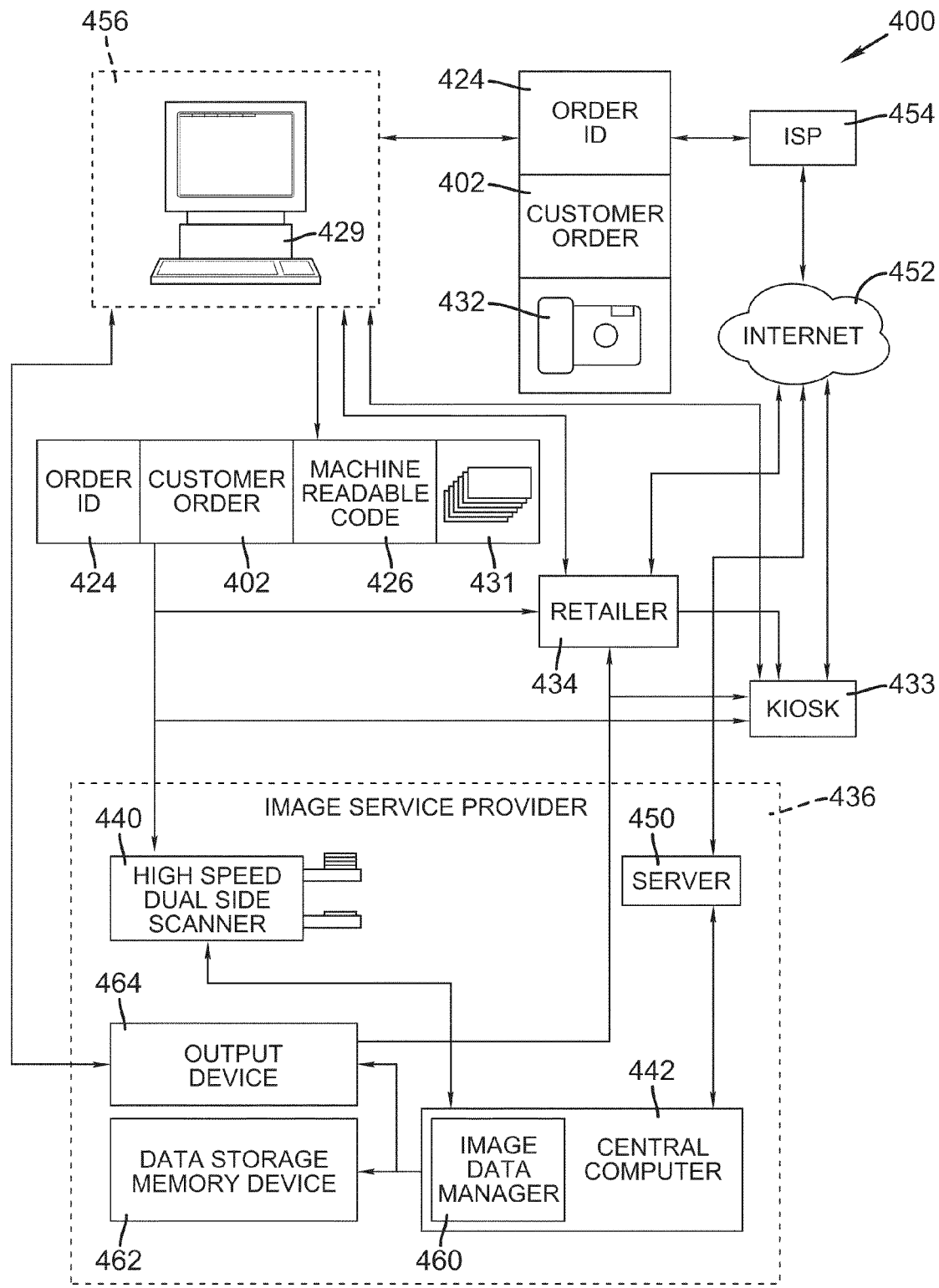
FIG. 10 illustrates a system for automatically generating a dynamic digital metadata record from digitized hardcopy prints.

FIG. 10 is one embodiment of a system 400 for automatically generating a dynamic digital metadata record from digitized hardcopy prints. In particular, the system 400 includes a source of images. This source of images can be hardcopy media 431, such as hardcopy images produced from a camera 432, digital scanner, etc. The images can be provided to a retailer 434 or an image service provider 436, which can be the same entity. A kiosk 433 or other type device (or system) can be provided at the retailer 434 for use by the retailer 434 or customer in organizing the images, reviewing the images and/or ordering of goods or services relating to the image as discussed herein.

The primary function of the retailer 434 is to accept the order from customers. The image service provider 436 is capable of providing the actual goods and/or services to the customer. The goods and/or services can be returned directly from the image service provider 436 to the customer or to the retailer 434 and then to the customer. In one embodiment, the image service provider 436 provides various ways for capturing and/or obtaining digital images. In FIG. 10, the image service provider 436 is provided with a scanner 440 and a computer 442, such as a central computer. A scanner 440 in the particular embodiment, is designed for scanning the hardcopy media 431, such as photographic prints, and turning the scanned images into a digital record file that can be digitally manipulated and used for providing of image goods and/or services. It is to be understood that inputs can be in the form of photographic negatives, slides, etc.

A central computer 442 can be used for generating a dynamic digital metadata record for each of the images. This can be done for example over a communication network, such as the Internet, whereby the service provider obtains digital images from various sources as previously described. Appropriate customer data information is entered into the system for association with the digital images scanned for each customer order. This can be accomplished by a variety of different methods. In a situation where hardcopy media is being provided for scanning, information can be provided on a customer order, such order form 402 which includes an order ID 424 and associated machine readable code 426. Thus, if the customer order form 402 is scanned, the appropriate code can, for example, identify that it is a customer order form 402 and provide certain encoded information. Further, the order form 402 can be set up such that by appropriately checking certain selection boxes, the information being requested can be immediately associated therewith. In addition, a customer order form 402 can be encoded with various numbers provided on the labels that are used for grouping of the hardcopy media 431. This way, as the media 431 is scanned, these codes can also be associated with the customer order 402 and automatically associated with the appropriate images by the central computer 442.

If a dynamic digital metadata record is sent, directly to the retailer 434 and/or computer 442, a similar type customer order number can be provided and associated with the media 431 and the customer order 402. The scanner 440 is also capable of reading and interpreting instruction forms and icons as previously discussed, such that the special instructions provided by instruction forms can be immediately interpreted and effectuated by the central computer 442. The central computer 442 can also be used for coordinating of the media 431 and can be associated with a server 450. The server 450 can be coupled to the Internet 452, which can be coupled to an Internet service provider 454. The Internet service provider 454 can be connected to a customer 456 having a computer 429 or other transceiving device.

System 400 includes an image data manager 460 that can manipulate the media as preprogrammed or by instructions that have been machine read by scanner 440 and forwarded on to computer 442. The manipulation can include, but not limited to, grouping, sorting, determining the best place (white space) to place text to be added, etc. and providing metadata as appropriate with regard to the associated images.

Also the image data manager 460 can automatically group and/or sort digitized images based on information stored in the dynamic digital metadata record. Accordingly, the data manager 460 can group and/or sort based on selected criteria such as texture, scene, faces, or content information obtained during scanning of the images and stored as metadata in the dynamic digital metadata record. Appropriate computer programs can be used to group the images in accordance with the selected criteria. Face recognition computer programs currently exist which can identify an individual from a plurality of images. Face recognition and other algorithms work more efficiently when images are known to be part of event groups. If several images are known to be of a birthday party, then face recognition probabilities can be weighted for an individual that has been in each image of the event sequence.

As shown in FIG. 10, a camera 432 can be used to capture an image of a person (or other item) against a very specific colored background known as a "blue screen" shot. A hardcopy print can be derived from the captured image. Algorithms are incorporated into the image data manager 460 to analyze the digitized image to extract recorded metadata and to derive metadata. A dynamic digital metadata record of the digitized hardcopy print is created from the extracted recorded metadata and the derived metadata. The dynamic digital metadata record can then be used to search for content and, subsequently, but not limited to, be used in performing automatic groupings.

Other useful information and/or characteristics about the captured image can be acquired and added to the dynamic digital metadata record. In this case, the image data manager 460 provides an interface (not shown) to receive the useful information and/or characteristics. Automatic sorting and grouping can be performed based on the useful information and/or characteristics. For example, over the years, many photofinishing printing characteristics have changed, but typically, for a time period or for a particular photofinishing lab, certain features may have remained constant, certainly for a single roll of developed film. Examples of such characteristics, but not by way of limitation, are: a particular size or shape (for example square); a white border around the image; serrated edges on the print; and a print date provide on the front or back side of the print. Any one or combination of these characteristics could be used for automatic grouping and/or sorting of the images.

The image data manager 460 can incorporate information found on spaces provided on the consumer's envelopes, labels, etc, used to group the images. The information can include the Who, What Where, When and Why of images, or groups of images, and be incorporated into the dynamic digital metadata record which can be stored with, or as part of, the images. Also the image data manager 460 can incorporate the group or label information provided by the customer, or obtained from another source, as a part of the computer file name. For example, a group titled "AndyBirthday" could have individual images labeled "AndyBirthday1", "AndyBirthday2", "AndyBirthday3" etc., so that if the images are moved throughout the computer or Internet, a person viewing the images would know the main subject of the image.

As images are processed through the image data manager 460, images can be presented to the consumer in a final form that represents the final additional product that can be ordered via a click of a mouse. This would encourage the purchase of additional products. The dynamic digital metadata record can be displayed with images to aid the consumer in remembering the significance of the images. Accordingly, any additional metadata can then be added to the dynamic digital metadata record.

In one embodiment, a consumer can be given retailer album pages to scan. The image data manager 460 can extract individual images from the album pages and save the individual images as individual files that can be utilized along with metadata associated with the individual files. In another embodiment, where images that have been acquired from various consumers and destined to be stored in one depository, the image data manager 460 can not only make one depository, but also group the images by the original source or owner. The image data manager 460 can incorporate other effects specified by the consumer during the ordering process, such as, but not limited to, music for slide shows or specified transitions or a particular background for an album page, a favorite border, or annotation for reprints.

Once the image data manager 460 has completed the image manipulation job, the image output is sent to a data storage memory device 462 and/or if a product is to be produced directly therefrom, it is sent to an appropriate output device, such as device 464. It is to be understood that the output device 464 can include a variety of different type devices. For example, but not limited to, the output device 464 can include an image storage and retrieval device, a device for printing images onto a media, including but not limited to photosensitive media, for producing of the hardcopy prints requested. Alternatively, the output device 464 can include a device for making a computer disk, a compact disk or other digital storage device wherein the images are arranged, sorted and stored as requested by the customer. The output device 464 can be used for producing transfers, which can be used for providing images on the various products such as mugs, T-shirts and other items. The output device 464 can be any appropriate device that is currently available or that may become available in which images can be provided in some form.

Figure 11:
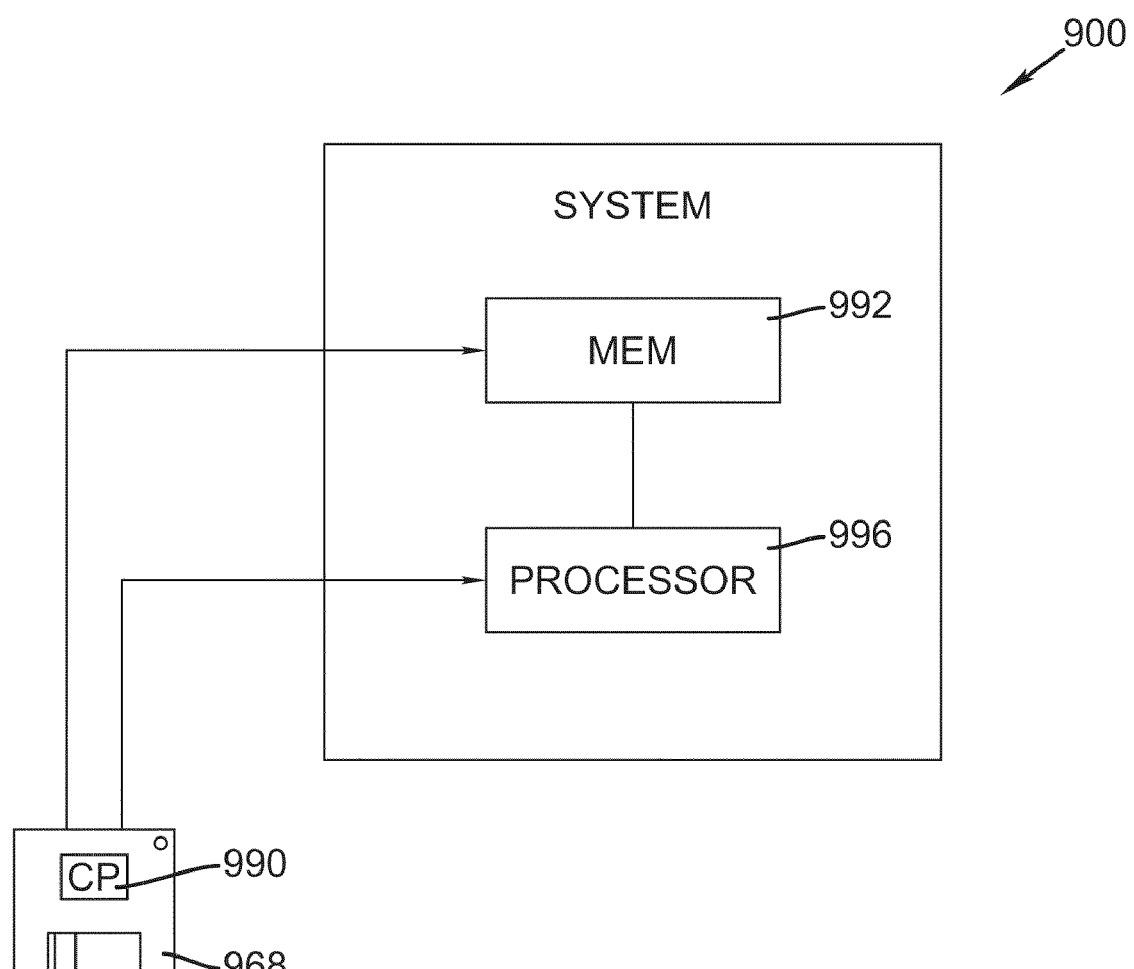
FIG. 11 illustrates a system for automatically generating a dynamic set of metadata from digitized hardcopy media with reference to FIGS. 1-10 using an executable program readable from a storage driver program.

FIG. 11 illustrates a system for automatically generating a dynamic digital metadata record from digitized hardcopy media with reference to FIGS. 1-10 using an executable program readable from a storage driver program. The process illustrated with reference to the present invention may be tangibly embodied in a computer-readable medium or carrier, e.g. one or more of the fixed and/or removable data storage devices 968 illustrated in FIG. 11, or other data storage or data communications devices. A computer program 990 expressing the processes embodied on the removable data storage devices 968 may be loaded into the memory 992 or into the system 900, e.g., in a processor 996, to configure the system 900 of FIG. 11, for execution. The computer program 990 comprise instructions which, when read and executed by the controller 900 of FIG. 11, causes the system 900 to perform the steps necessary to execute the steps or elements of the present invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

Parts List:
10 hardcopy media
20 $1^{st}$ subgroup images of bordered 3.5"×3.5" prints
30 $2^{nd}$ subgroup images of borderless 3.5"×5" prints with round corners
40 $3^{rd}$ subgroup images of bordered 3.5"×5" prints
50 $4^{th}$ subgroup images of borderless 4"×6" prints
60 Picture book
70 Picture CD
80 Magnetic storage of images
90 Photographic print media
91 Image surface
92 Date designation
94 Border
96 image data
100 non-image surface
102 Watermark
110 Recorded metadata
111 recorded metadata fields
120 sample values
130 hardcopy media
140 Recorded metadata
150 Derived metadata
151 metadata fields
160 Derived metadata
161 sample values 170 Derived metadata from scanned image with sample data
180 Recorded metadata
190 Derived metadata
200 digital metadata record
210 Prepared media
215 Scanned media/prints
220 Extracted recorded metadata
225 color or black and white algorithm
230 Decision point
235 black and white color map
240 flesh color map
245 recorded rotation angle
250 border detector
255 border
260 Measure the Dmin (minimum density) for the neutral color calculation
265 recorded border minimum density
270 Extracted text information/annotation
275 index print
277 Detect like events (pictures taken at the same event)
279 Record the event in the metadata record
280 detected index print
282 Recorded index print
284 Detected index print events
286 Recorded index print events
290 recorded border annotation
292 Record the border annotation bitmap in the metadata record
294 Detected border style
296 Recorded border style
298 complete metadata record
300 digital metadata record
310 complete metadata record
320 images organized by date
330 images organized into subgroups
340 images organized into subgroups
350 images organized into subgroups
400 system
402 customer order form
424 order ID
426 machine readable code
429 computer
431 hardcopy media
432 camera
433 kiosk
434 retailer
436 image service provider
440 scanner
442 central computer
450 server
452 Internet
454 Internet service provider
456 customer
460 image data manager
462 memory device
464 output device
506 determine image transform
510 image transform
514 apply image transform
516 watermark
518 watermark
520 image
522 landscape image
526 portrait image
532 image
540 image showing the effects of cropping artifact
545 background scan of the cropped image
900 system
968 data storage devices
990 computer program
992 memory
996 processor

What is claimed is:

1. A method for generating an image transform, comprising:
scanning an image side and a non-image side of a plurality of hardcopy media;
comparing the scanned non-image sides of a first and a second images; and
determining an image transform based on the comparison of the scanned non-image sides of the first and second images;
applying the image transform to the first or second images.

2. The method of claim 1, wherein comparing the scanned non-image sides further comprises:
determining whether the first and second images are in a common event grouping based on the comparison of the scanned non-image sides of the first and second images; and
determining the image transform based on the scanned first and second images when the first and second images are determined to be in the common event grouping.

3. The method of claim 1, wherein applying the image transform further comprises modifying the orientation of the first or second image.

4. The method of claim 1, wherein applying the image transform further comprises modifying the color of the first or second images.

5. The system of claim 1, where wherein a processor modifies a color of the first image.

6. A system for generating an image transform, comprising:
a scanner means for digitizing an image side and a non-image side of a plurality of hardcopy media;
a processor means for determining an image transform for a first image on a first of the plurality of hardcopy media based on the scanned non-image side of the first image and applying the image transform to the first image; and
wherein the processor means for determining the image transform further comprises a circuit for comparing the scanned non-image sides of a second image of a second of the plurality of hardcopy media and the first image, and determining the image transform based on the comparison.

7. The system of claim 6, wherein the processor means further determines whether the first image and second image are in a common event grouping based on the comparison of the scanned non-image sides of the first and second images, and based on the scanned first and second images, creates the image transform when the first and second images are determined to be in the common event grouping.

8. The system of claim 6, wherein the processor means modifies the orientation of the first image.

* * * * *